United States Patent [19]

Jensen

[11] Patent Number: 4,883,971
[45] Date of Patent: Nov. 28, 1989

[54] METHOD AND APPARATUS FOR DETERMINING INFRARED SIGNATURE OF OBJECTS

[75] Inventor: David G. Jensen, Auburn, Wash.
[73] Assignee: The Boeing Company, Seattle, Wash.
[21] Appl. No.: 286,628
[22] Filed: Dec. 19, 1988
[51] Int. Cl.[4] ............................................. H01K 1/14
[52] U.S. Cl. ............................. 250/495.1; 250/493.1; 273/348.1
[58] Field of Search ........................ 250/495.1, 493.1; 273/348.1

[56] References Cited

U.S. PATENT DOCUMENTS

| | | | |
|---|---|---|---|
| 2,869,120 | 1/1959 | Lolmaugh et al. | 343/18 |
| 3,227,879 | 1/1966 | Blau et al. | 250/84 |
| 4,240,212 | 12/1980 | Marshall et al. | 434/11 |
| 4,279,599 | 7/1981 | Marshall et al. | 434/21 |
| 4,405,132 | 9/1983 | Thalmann | 273/348.1 |
| 4,422,646 | 12/1983 | Rosa | 273/348.1 |
| 4,428,583 | 1/1984 | Feagle | 273/348.1 |
| 4,546,983 | 10/1985 | Rosa | 273/348.1 |
| 4,605,232 | 8/1986 | Hundstag | 273/348.1 |
| 4,659,089 | 4/1987 | Rosa | 273/348.1 |

Primary Examiner—Jack I. Berman
Attorney, Agent, or Firm—Joan H. Pauly

[57] ABSTRACT

A simulating device or model comprises a plurality of layers of fiber reinforced composite material, including two adjacent electrically insulative layers (44). An elongated conductor (30) is interposed between the two layers (44). The conductor (30) is arranged in a continuous winding pattern, such as a serpentine pattern formed by folding resistance heating ribbon to form adjacent spaced regions or legs (34) of the continuous conductor (30). The composite material and conductor (30) form an integral structure and simulate the three dimensional shape of an object whose infrared signature is to be simulated. The conductor (30) is positioned at a sufficient depth relative to an outer surface of the structure, and the legs (34) of the conductor (30) are sufficiently close to each other, to produce a substantially continuous temperature gradient on the outer surface when the conductor (30) is heated by supplying electric power thereto. The heated model is viewed at a plurality of angles with an infrared detector (2) to determine the infrared signature at each angle.

37 Claims, 5 Drawing Sheets

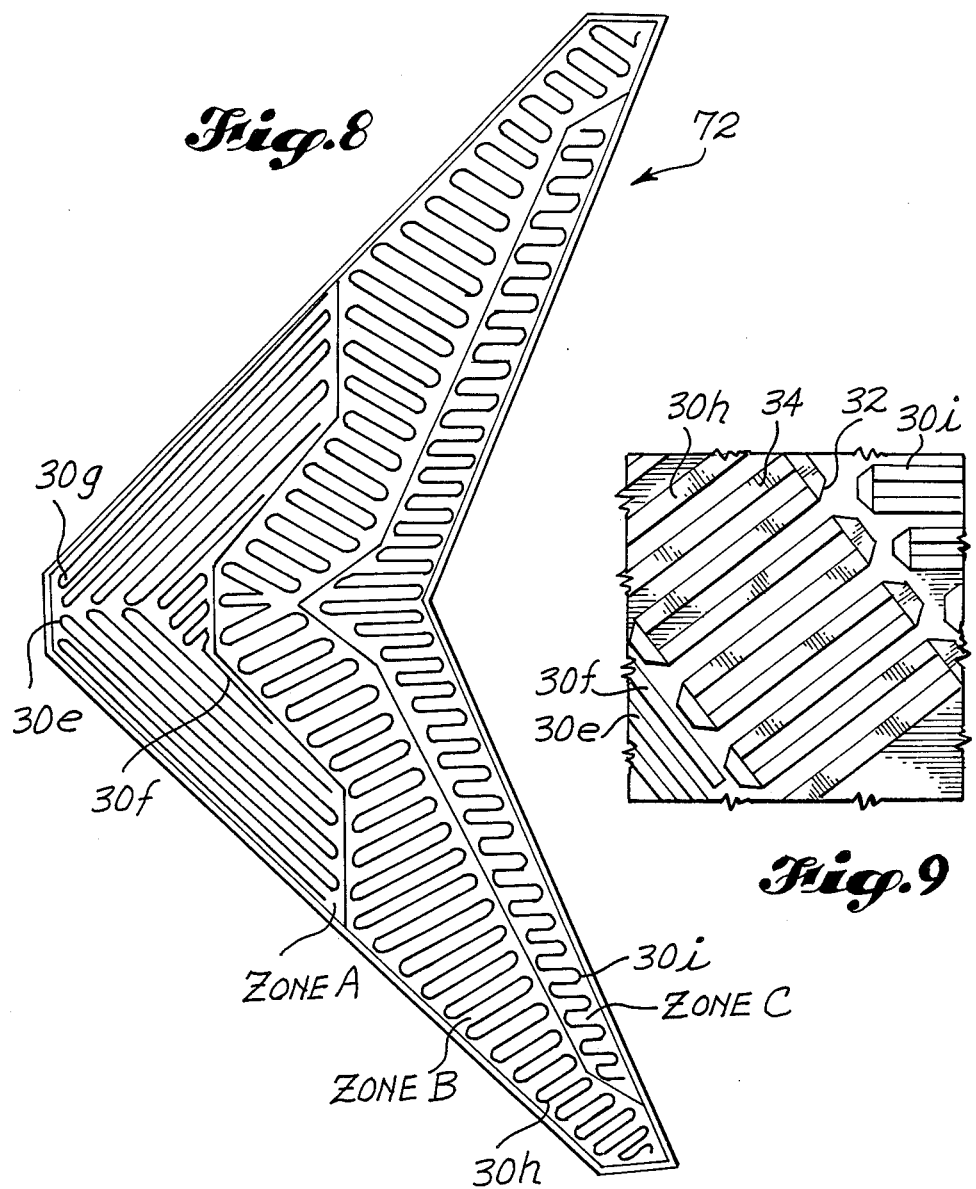

METHOD AND APPARATUS FOR DETERMINING INFRARED SIGNATURE OF OBJECTS

DESCRIPTION

1. Technical Field

This invention relates to systems for determining the infrared signatures of objects and, more particularly, to such a system in which an elongated conductor in a continuous winding pattern is integrally incorporated into a composite material structure that simulates the three dimensional shape of the object, and the conductor is heated to produce a substantially continuous temperature gradient on the outer surface of the structure.

2. Background Art

The use of infrared detectors to detect and/or identify objects has been known for a number of years. Both the objects being detected and the detectors may be located either on the ground or in the air. For example, infrared detectors on aircraft can be used to detect objects on the ground for various purposes, such as detecting military targets or verifying the location of the aircraft. Infrared detectors located at stationary or mobile ground installations can be used to detect and/or identify military vehicles on the ground or in the air. With the increasing sophistication of the design of military vehicles and detecting apparatus, it is presently highly desirable to develop a method of accurately predicting the visibility of a military vehicle in the presence of infrared energy detecting devices.

Two possible approaches to determining the infrared signature of a vehicle are mathematical analysis and field testing. Mathematical analysis is cumbersome and requires a very large data base to produce a minimally acceptable level of accuracy. Field testing is very expensive and can only be carried out at a relatively late stage of the design of a vehicle. Mathematical modeling cannot readily accommodate predicting the effects of different surfaces on each other and what types of changes in the infrared signature will be produced by varying the surface properties of a vehicle. Field testing cannot readily accommodate changes in configuration. Therefore, neither mathematical analysis nor field testing is suitable as a technique for predicting the infrared signature of a military vehicle, determining how such signature can be varied, and using this information to help determine the final design of the vehicle.

Another approach to determining, and tailoring, the infrared signature of a military vehicle is the use of models to simulate the vehicle. The use of models is an effective tool in predicting vehicle characteristics, especially in the design stages. However, there are a number of problems associated with known modeling techniques. A primary problem is the inadequacy of known techniques to simulate the infrared signature of an object with an acceptable degree of accuracy. This is especially true when the object has a complex shape with multiple components. Known techniques do not adequately simulate the effect on the infrared signature of complex curvature of surfaces of the object, irregularities in the object, such as openings in the outer surfaces, and reflection of infrared radiation emitted by one surface from another surface. In addition, systems in which high performance aircraft are being modeled must be capable of producing elevated temperatures to recreate the expected actual use temperatures and temperature profiles. Furthermore, the models must produce sufficient emissive energy for the infrared detectors to accurately quantify the infrared signature in the presence of background radiation.

One of the major reasons why known systems are inadequate to accurately simulate the infrared signature of an object is that such systems provide a basically planar model and do not begin to simulate the actual three dimensional shape of the object. This failure to provide a realistic three dimensional model prevents known systems from being able to predict the effect of radiation from one surface striking another surface on the overall signature of the object and results in a total failure to take into account the effect of variations in the emissive patterns from the different surfaces.

A possible approach to developing a three dimensional model of an object is to provide a plurality of planar profiles of the object as it would appear when viewed from a variety of angles. This approach can reasonably simulate the emissive pattern of a surface at a variety of angles if the surface is a Lambertian surface, i.e., if the surface emits infrared radiation in the uniform fashion depicted in FIG. 10. Lambertian surfaces emit radiation in a pattern which uniformly decreases as the viewing angle relative to the surface increases from 90° to 180°. The uniform decrease forms the circular pattern illustrated in FIG. 10. When a perfect Lambertian surface is viewed from an oblique angle, the decrease in radiation per unit area of surface viewed is exactly compensated by the increase in the total surface area subtended by the detector. Thus, each planar profile of the surface can give an accurate prediction of the amount of radiation that would be seen by a detector at the viewing angle represented by the profile.

Although planar models, including models based on a plurality of profiles, may be useful in predicting the infrared signature of a single surface that is a Lambertian surface, the practical applicability of systems using such models is severely limited. Many surfaces emit radiation in a non-uniform, non-Lambertian pattern. An example of a non-Lambertian emission pattern is shown in FIG. 11. Moreover, most objects for which it is desired to obtain an accurate prediction of the infrared signature have complex shapes with multiple surfaces positioned such that infrared radiation emitted by some of the surfaces affects the signature of other surfaces. Two dimensional models cannot accurately simulate the effect of these factors of irregular emission patterns and interaction of emissions from different surfaces or other factors that affect the actual signature of a three dimensional object, such as irregularities in the surface of the object.

The patent literature includes a number of examples of systems which use devices that simulate the infrared signature of an object. U.S. Pat. Nos. 2,869,120, granted Jan. 13, 1959, to O. B. Lolmaugh et al., and 4,428,583, granted Jan. 31, 1984, to H. B. Feagle, disclose airborne targets that produce an exhaust stream to simulate the exhaust of a jet or rocket. U.S. Pat. No. 3,227,879, granted Jan. 4, 1966, to D. Z. Blau et al., discloses a simulator that simulates the area which infrared detectors on an aircraft will scan during flight. Output from the simulator provides a source that is used on the aircraft to compare to the output of infrared detectors on the aircraft to determine the location of the aircraft or the location of a ground target. The simulator is prepared by depositing a metallic coating on a composite material base. The coating is then etched to vary the emissivity of the surface. The simulator is heated by placing the base in contact with a hot plate.

Simulated targets are disclosed in U.S. Pat. Nos. 4,240,212, granted Dec. 23, 1980, to A. H. Marshall et al.; 4,279,599, granted July 21, 1981, to A. H. Marshall et al.; 4,405,132, granted Sept. 20, 1983, to C. Thalmann; 4,422,646, granted Dec. 27, 1983, to S. P. Rosa; 4,546,983, granted Oct. 15, 1985, to S. P. Rosa; 4,605,232, granted Aug. 12, 1986, to R. L. Hundstad; and 4,659,089, granted Apr. 21, 1987, to S. P. Rosa. German specification No. 3,133,846, published Mar. 17, 1983, appears to dislcose a planar target.

In U.S. Pat. No. 4,279,599, cited above, Marshall et al. disclose a simulated target comprising a metallic plate with an etched or machined front surface and a rear surface to which a heater is attached. Hundstad discloses a planar target with a coating that reflects and diffuses infrared radiation from a separate infrared source. Thalmann discloses a target with a front face covered by a printed circuit having two interleaved arrays of parallel conductor strips. Short patches of resistance material bridge adjacent conductor strips to provide heat generating areas. Thalmann states that the thermal signature could also be produced by providing a multiplicity of heat emitting areas on the front surface of the target and exposing the front surface to radiation from infrared lamps.

U.S. Pat. No. 4,240,212, cited above, discloses a device, such as an expendable target, for simulating the thermal signature of an object. The device is designed for use in training personnel. The device includes a support made from a material like plywood shaped to present a profile of a military target, such as a tank. The front face of the plywood has a coating of an electrically resistive material, such as carbon impregnated paper or paint. Positive and negative conductive strips or busses are attached to the back surface of the support. Electrical leads extend through the busses, support, and coating to electrically connect the busses and the coating. The device has a current path for heating the resistive material coating that extends from a source of electrical energy along the positive busses, through the leads to the resistive material, through the resistive material to the leads associated with the negative busses, and through these leads and the negative busses back to the electrical source. Marshall et al. describe the flow of electricity along the resistive coating as being in a sheet-like fashion over the surface. In order to reduce heat losses due to convection, the target may be insulated by a thermal blanket or plastic bubble over the front face. Areas of the front coating may be formed by a different material, such as black paint, to vary the thermal intensity along the front face When the coating is provided in the form of impregnated paper, marginal areas and seams of the paper may be tacked down with strips of copper. These strips can be folded to lay fat and conform to a curved boundary, such as the circumference of a wheel or the crown of a tank turret.

The three Rosa patents issued on related applications . and disclose simulated targets. The targets are fabricated by positioning modules on a support. Each module includes 1 a continuous conductive layer sealed inside electrically insulating top and bottom sheets, such as mylar sheets. Two conductive strips extend along opposite sides of the module between the sheets in electrical contact with the conductive layer. Electrical leads are connected to the strips to energize the module and provide current to the conductive layer to heat it and cause it to emit infrared radiation. The front face of the module may be covered with a thermal insulating pad transparent to infrared radiation. In U.S. Pat. No. 4,422,646, Rosa states that the target may be made three dimensional by adding additional modules. In the other two patents, Rosa discloses varying the infrared signature of the module by varying the thickness of the conductive layer, varying its composition, and/or including perforations in the top sheet. These two patents also disclose the preferred embodiment of the target support on which the modules are mounted as having a curved profile to display the modules to more than one direction.

The above patents and the prior art that is discussed and/or cited therein should be studied for the purpose of putting the present invention into proper perspective relative to the prior art.

DISCLOSURE OF THE INVENTION

A subject of the invention is a device for simulating the infrared signature of an object. According to an aspect of the invention, the device comprises a plurality of layers of fiber reinforced composite material and an elongated conductor. The layers of composite material include two adjacent electrically insulative layers. The conductor is interposed between these two layers and connectable to an electric power source. The conductor is arranged in a continuous winding pattern having a plurality of spaced regions All the layers are bonded together to form, with the conductor, an integral structure. The structure is shaped to simulate the three dimensional shape of the object. The regions of the conductor pattern are sufficiently close to each other, and the conductor is positioned at a sufficient depth relative to an outer surface of the structure, to produce a substantially continuous temperature gradient on the outer surface of the structure when the conductor is heated by supplying electric power thereto.

The conductor may be provided in various forms. In the preferred embodiment, the conductor comprises a resistance heating ribbon arranged in a serpentine pattern with a plurality of spaced substantially straight legs formed by folding the ribbon. This form of the conductor has a number of advantages. Its use is very economical. Heating ribbon is commercially available in various materials, widths, and thicknesses. Moreover, the ribbon is relatively easy to handle and is readily formed into a desired pattern. Thus, its use helps to minimize both material acquisition and production costs. The ribbon is also very versatile. It can be arranged in a variety of patterns to obtain a particular temperature gradient or to adjust the temperature gradient on the surface of the structure. In addition, the relative flatness of the ribbon helps prevent voids in or delamination of the structure in the area of the conductor.

The temperature on the outer surface of the structure may be varied in a number of ways. A feature of the invention is including in the device a second elongated conductor interposed between the two insulative layers and spaced from the first conductor. The second conductor is arranged in a continuous winding pattern having a plurality of spaced regions. The second conductor is connectable to an electric power source separately from the first conductor to produce a substantially uniform temperature gradient on the outer surface different from the gradient produced by the first conductor. Another feature of the invention is creating temperature differences on the outer surface by arranging the conductor so that different adjacent pairs of the regions of the conductor have different spacing between the regions in the pair to produce gradual temperature variations on the outer surface.

The continuity of the temperature gradient, i.e., the uniformity of the gradient and/or the smoothness of the changes over the gradient, is obtained primarily by the spacing of the regions of the conductor and the depth of the conductor, as described above In some applications, it is desirable to provide an additional means for insuring continuity of the gradient. A feature of the invention is a thermally conductive layer positioned between the conductor and the outer surface of the structure to assist in minimizing temperature ridges and valleys on the outer surface.

In most situations, it is desirable to verify the temperature of the composite material to insure that an accurate simulation of the infrared signature is being achieved. Therefore, a preferred feature of the invention is a plurality of thermocouples positioned in the composite material between the regions of the conductor for monitoring heating of the plurality of layers by the conductor.

The device of the invention may include a plurality of structures each of which has a plurality of layers of composite material and an elongated conductor, as described above. Each structure is shaped to simulate the three dimensional shape of a portion of the object whose infrared signature is being simulated. The structures are joined together to simulate the three dimensional shape of the entire object. Devices of the invention including a plurality of structures may also include the other features of the invention discussed above.

Another subject of the invention is a method of determining the infrared signature of an object. According to an aspect of the invention, the method comprises providing a device in accordance with claim 1. Electric current is supplied to the conductor in the device to heat the conductor and produce a substantially continuous temperature gradient on the outer surface of the structure. The outer surface is viewed with an infrared detector from one or a plurality of angles to determine the infrared signature at such angle or angles.

The method may also include applying a coating to the outer surface and viewing the coated outer surface with an infrared detector to determine the effect of the coating on the infrared signature. When the effects of different coatings are of interest, the coating may be removed and a second coating applied to determine the effect of the second coating.

The preferred manner of accomplishing the energizing of the conductor to heat the composite material and thereby provide infrared emissions comprises exposing opposite end portions of the conductor by removing composite material on a surface of the structure opposite the outer surface. Insulated electrical conductors are attached to the exposed end portions of the conductor. Electric current is supplied to the conductor through the insulated conductors. This arrangement creates the desired heating and infrared emissions by supplying electrical energy from the back of the structure without disturbing the front surface of the structure. Therefore, the continuity of the temperature gradient on the front surface is not compromised by the electrical connections, and a high degree of accuracy in the simulation of the infrared signature of the object can be maintained.

When thermocouples are provided to monitor the heating of the composite material, they are also preferably connected from the back of the structure without disturbing the outer surface.

The method of the invention may also be practiced by providing a device in accordance with claim 9. In such case, electric current is supplied to each of the conductors to heat the conductor and produce a substantially continuous temperature gradient on the corresponding outer surface. The outer surfaces of the structures are viewed together with an infrared detector to determine the infrared signature. Preferably, viewing the outer surfaces at a plurality of angles is accomplished by tilting the device at the plurality of angles and viewing the device with a stationary infrared detector. The tilting procedure is relatively simple and easy to carry out. In addition, it provides an accurate simulation of the manner in which an aircraft would be viewed by an infrared detector located at a ground station.

The method and apparatus of the invention provide a system for accurately simulating the infrared signature of an object. The system of the invention is more efficient and cost effective than mathematical and field testing techniques. The system of the invention readily accommodates testing of changes produced in the infrared signature of an object by changes in the configuration and/or surface properties of the object. In the system of the invention, the actual infrared signature of the three dimensional object is accurately simulated. The system of the invention overcomes the limitations on accuracy encountered in the two dimensional systems discussed above. The system of the invention accurately simulates the effects of different surfaces of the object on each other, the effects of actual emissive and other characteristics of the objects' surfaces, and the effects of other characteristics of the real object, such as minor irregularities in the surfaces.

The system of the invention is also very versatile and includes a number of parameters which may be varied to simulate changes in temperature along the actual surfaces of the object. Such parameters include the spacing of the regions of the conductor and the number of conductors within a structure, as discussed above, as well as other factors, such as the particular characteristics of each conductor. These parameters have predictable effects on the heating patterns obtained and can readily be varied to adjust the heating patterns to match the known heat generating characteristics of the object.

In the system of the invention, the substantially continuous temperature gradients accurately simulate the appearance to an infrared detector of actual surfaces of an object. The system of the invention makes it possible to reduce ridges and valleys in the gradients to minor fluctuations that are sufficiently small to be undetectable to an infrared detector In a particular application, the level of such fluctuations may be easily tailored to conform to the level of sensitivity of a particular type of detector. Another advantage of the invention is that it is capable of producing sufficient temperatures and levels of infrared emission to simulate the temperatures on high performance military aircraft and to permit an accurate determination of the infrared signature in the presence of background emissions.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 8 is a top plan view of another example of a structure constructed in accordance with the invention.

FIG. 9 is an enlarged fragmentary view of a portion of FIG. 8.

BEST MODE FOR CARRYING OUT THE INVENTION

Figure 1:
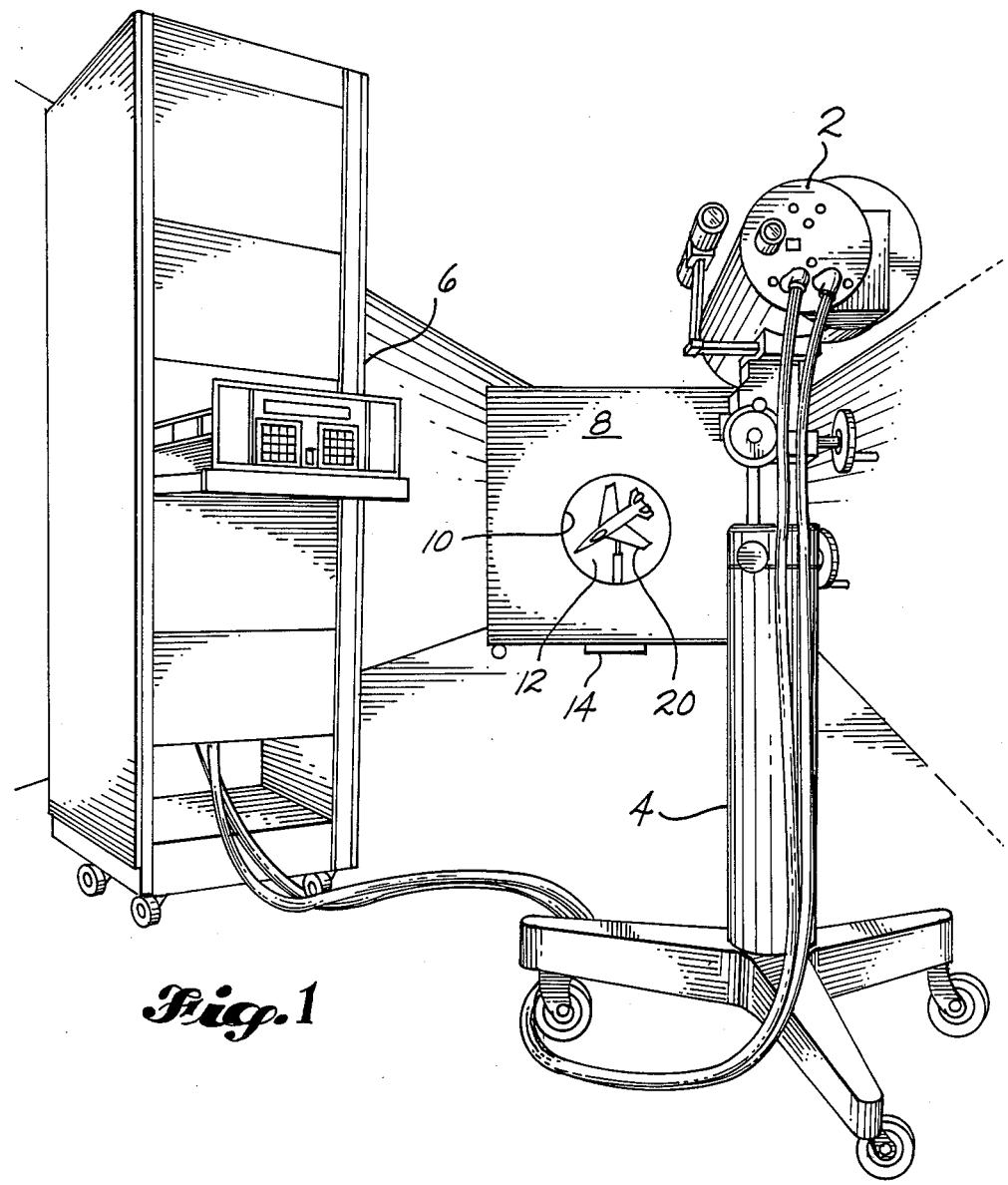
FIG. 1 is a pictorial view illustrating the practice of the preferred embodiment of the method.
Figure 2:
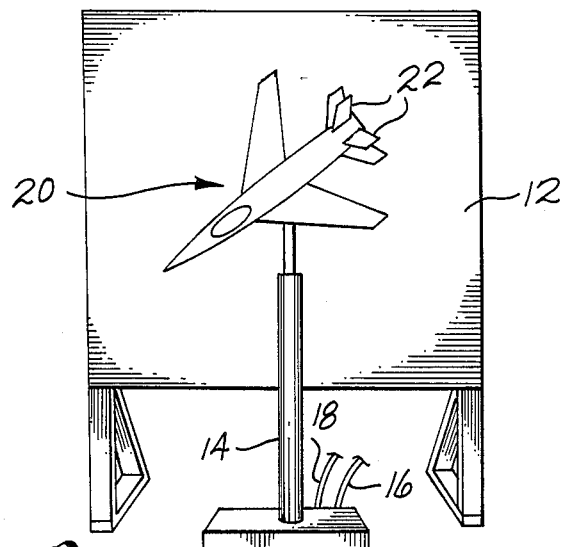
FIG. 2 is a pictorial view of the model and background screen shown in FIG. 1.

The drawings illustrate the best mode for carrying out the method and apparatus of the invention currently known to the applicant. The exact form of the device of the invention will naturally vary to accommodate the different characteristics of different objects whose infrared signatures are being simulated. FIGS. 1 and 2 illustrate an installation for studying the infrared signatures of models. The invention was developed with the type of installation shown in FIGS. 1 and 2 in mind, and it is contemplated that the invention will be used primarily in the type of installation shown. However, it is of course to be understood that the invention may also be used to advantage in other types of installations.

Referring to FIGS. 1 and 2, an infrared detector 2 of a known type is mounted on a movable support 4. The detector 2 is electrically connected to a computer control module 6. In the practice of the invention, an operator at a computer terminal (not shown) inputs instructions to the control module 6 which in turn controls recording of data received by the detector 2. The detector 2 and control module 6 are preferably located in a long narrow room, as shown in FIG. 1. The model 20 being studied is positioned a distance from the detector 2. This distance is preferably chosen so that the image presented by the model 20 to the detector 2 is consistent with an image of the actual object that would be seen by a detector in a field situation.

The scale model 20 shown in FIGS. 1 and 2 simulates a type of military aircraft which has twin tail fins 22. The model 20 is mounted on a support 14 in front of a background screen 12 (FIG. 2). A screen 8 is positioned in front of the model 20 between the model 20 and the detector 2. The model 20 is aligned with an opening 10 in the screen 8 through which the model 20 is visible to the detector 2. Preferably, the screen 8, the background screen 12, and the portions of the support 14 which are visible through the opening 10 are black to provide uniform background infrared radiation for the model 20. As shown in FIG. 2, two electrical conduits 16, 18 extend from the base of the support 14 to connect the pivot mechanisms of the support 14 and the heating conductors in the model 20, respectively, to a source of electric power. Each conductor 16, 18 includes a bundle of wires which are connected to an appropriate power source. Preferably, the conductor 16 is tied into the control module 6 so that the model may be pivoted automatically at predetermined intervals to automatically provide a series of infrared images at a plurality of angular orientations. The wires in the conductor 18 extend into the model 20 through an opening in the model 20 and are attached to conductors integrated into the model 20, as described further below.

In accordance with the invention, a device, such as the model 20, for simulating the infrared signature of an object comprises one or more structures or components. Each structure is composed of a plurality of layers of fiber reinforced composite material. A wide variety of types of composite material may be used. For example, the material may have a matrix composed of a resinous material, such as various known forms of epoxy, phenolic and polyimide resins. The matrix may also be of a ceramic material formed by curing a sol gel precursor (an aqueous solution of ceramic elements). The fiber reinforcement in the matrix may be formed by various types of fibers which are either continuous or discontinuous, and either randomly disposed, multidirectional, or monodirectional. The fibers may be graphite, glass, quartz, or other types of fibers known in the art of composite materials. The primary limitation on the composition of the composite material is that it must include two adjacent electrically insulative layers. Such two layers may not include either a conductive matrix or conductive fibers, such as graphite fibers. When the structure is formed by laying a plurality of plies of fiber reinforced/resin matrix prepreg tape or sheets, each insulative layer may be formed by a single or a plurality of plies of prepreg.

The structure of the device of the invention also includes an elongated conductor interposed between the two insulative layers and connectable to an electric power source. The conductor is arranged in a continuous winding pattern having a plurality of spaced regions. The insulative layers must provide sufficient insulation to prevent shorting of the conductive path between the regions of the conductor. Conductive materials, such as graphite fibers, may generally be used in portions of the structure sufficiently insulated from the conductor to avoid shorting. The winding pattern of the conductor may take the type of flattened serpentine pattern shown in FIGS. 3-9. Other examples of possible winding patterns are a more circular pattern, which may be accomplished when the conductor has a relatively small width, and a spiral pattern, which might be used, for example, around the nose portion of an aircraft model formed as a single hollow structure.

In each structure, the layers of composite material are bonded together to form, with the conductor, an integral structure. The structure is shaped to simulate the three dimensional shape of the object being studied or, in the case of a simulating device comprising a plurality of structures, the three dimensional shape of a portion of the object. When the device includes a plurality of structures, the structures are joined together to simulate the three dimensional shape of the entire object.

An important feature of the invention is the integration of the conductor into the composite material in a manner which produces a substantially continuous temperature gradient on the outer surface of the structure when the conductor is heated by supplying electric power thereto. As used herein, the term "gradient" includes a temperature profile which changes over the outer surface, as well as a uniform temperature profile. In the latter case, there is a zero rate of change of the temperature across the gradient. The term "substantially continuous" means that deviations from the uniformity of temperature or smoothness of temperature changes along the gradient comprise only minor fluctuations or ridges and valleys (hot spots and cold spots) that have magnitudes sufficiently small to be undetectable to the type of infrared detector in connection with which the infrared signature of the object is being determined.

The continuity of the temperature gradient, and the particular temperatures represented by the gradient, are attained by adjusting the parameters of the device. The continuity of the temperature gradient is achieved primarily by spacing the regions of the conductor sufficiently close to each other, and positioning the conductor at a sufficient depth relative to the outer surface of the structure, to allow the heat provided by the conductor to spread and even out before it reaches the outer surface of the structure. The choice of the depth of the conductor is preferably made with additional factors in mind, such as the power requirements for heating the outer surface and avoidance of preferential heating of the interior of the device.

Although adjusting the parameters of the spacing of the conductor regions and the depth of the conductor is the primary means for obtaining the continuity of the temperature gradient, other parameters of the device also have an effect on both the continuity of the gradient and the actual temperatures along the gradient. These other parameters include the specific type of composite material used in each of the layers of composite material, the electrical characteristics of the conductor, the physical characteristics of the conductor, the details of the winding pattern in addition to the spacing of the conductor regions, and the amount of current supplied to the conductor. The physical characteristics of the conductor which are easily variable include, when the conductor is formed by resistance heating ribbon, the width and thickness of the ribbon. Commercially available widths range from thin round wire gauges to ribbon width in excess of ½ inch. Available thicknesses range from about 2 mils to over 10 mils. The electrical characteristics can be varied by the choice of the ribbon material. Examples of suitable conductor materials are the alloys Climax (trademark), constantan, Excello (trademark), Monel Metal (trademark), and Nichrome (trademark).

Figure 3:
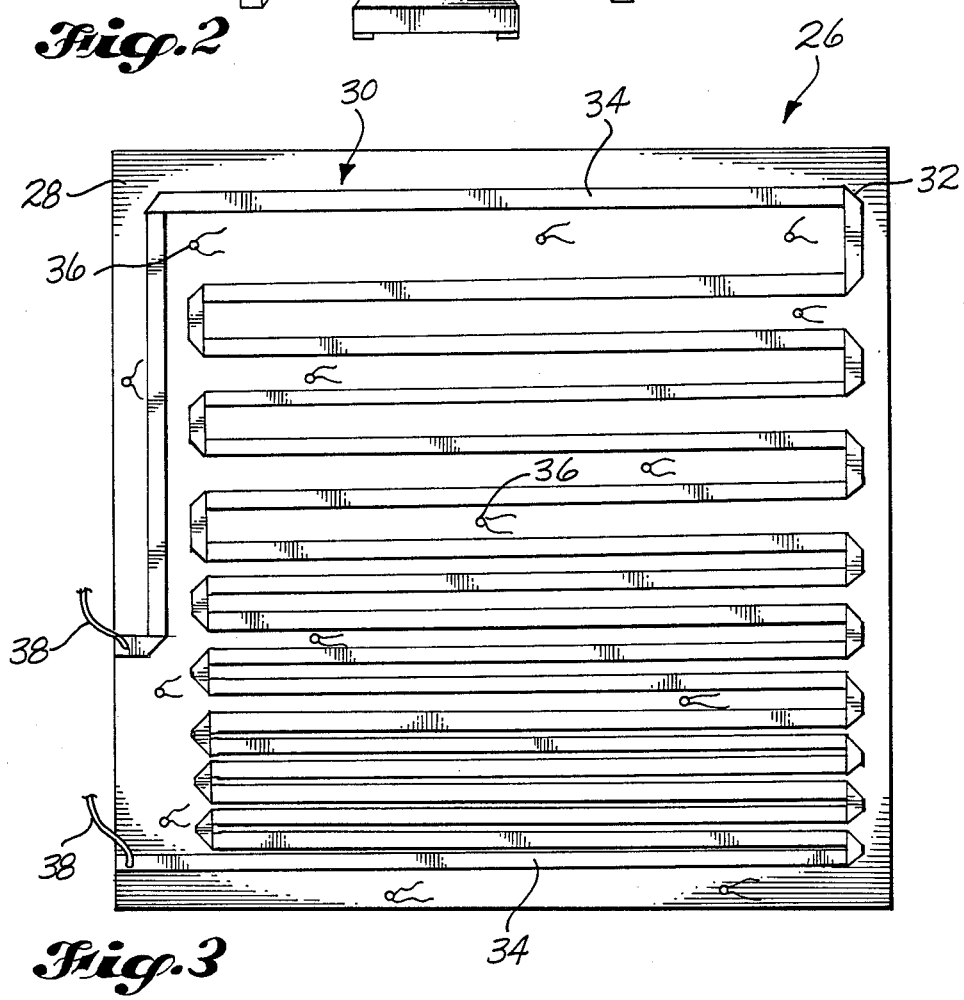
FIG. 3 is an elevational view of the rear face of a panel constructed in accordance with the invention, illustrating the positioning of thermocouples and electrical leads.

FIG. 3 shows a type of test panel 26 that was fabricated during the development of the invention to test various parameters of the apparatus of the invention. The panel 26 is composed of composite material 28 into which a conductor 30 is integrally incorporated. In FIG. 3, the conductor 30 is visible through the material 28. The conductor 30 illustrates the preferred embodiment of the conductor of the invention which is formed by a resistance heating ribbon arranged in a serpentine pattern with a plurality of spaced substantially straight regions or legs 34 connected by folded portions 32 of the ribbon. As can be seen in FIG. 3, between each pair of adjacent legs 34, there are two approximately 90° folds 32 in the ribbon, resulting in substantially parallel legs 34. The parallel relationship of the legs 34 is not necessary, as discussed further below, but it has the advantage of simplicity. However, deviations from a parallel pattern are sometimes advantageous since they facilitate heating an irregularly shaped surface area and provide flexibility in shaping the temperature profile.

FIG. 3 illustrates a number of features of the invention. One such feature is the differential spacing of the legs 34 of the conductor 30. Different adjacent pairs of conductor legs 34 have different spacing between the legs 34 in the pair to produce gradual temperature variations on the outer surface of the panel 26. Moving from bottom to top (as shown) the spacing between the legs 34 gradually increases to produce a gradually decreasing temperature gradient from the bottom to the top of the panel 26. Gradual temperature variations on the outer surface may also be produced by providing a plurality of adjacent separate conductors, each of which is heated to a different temperature. This approach is acceptable if the number of conductors required is not prohibitive and the temperature differences are sufficiently small to present the appearance of smooth variations to a detector.

Another feature shown in FIG. 3 is the plurality of thermocouples 36 that are positioned in the composite material between the legs 34 of the conductor 30. The thermocouples 36 are used during the practice of the method of the invention for monitoring heating of the composite material by the conductor 30. Still another feature illustrated in FIG. 3 is the manner in which the electrical leads 38 are connected to the conductor 30. The leads are formed by insulated wires 38 and are attached to the rear face of the panel 26. The attachment of the leads 38 is accomplished by abrading the composite material on the rear face of the panel 26 to remove sufficient composite material to expose opposite end portions of the conductor 30. The amount of material removed is just sufficient to accomplish the exposure of the opposite end portions without damaging the conductor 30 or disturbing the layers of composite material on the other side of the conductor 30. The leads 38 are attached to the exposed end portions of the conductor 30. Various conventional methods of attachment may be used. For example, Monel Metal is quite solderable while Nichrome is more easily spot welded.

Figure 4:
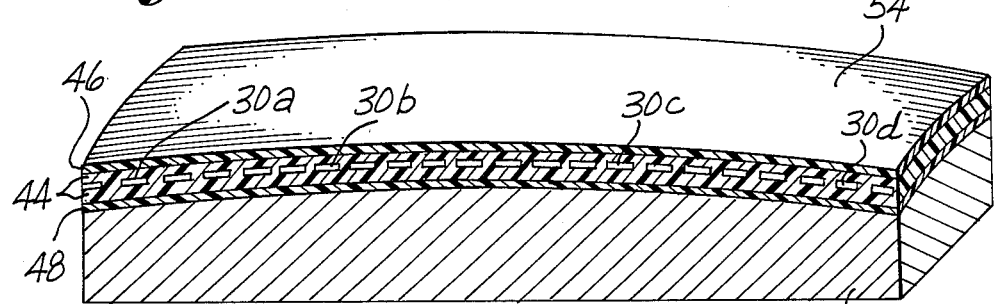
FIG. 4 is a pictorial view of a lay-up illustrating the fabrication of the device of the invention.
Figure 6:
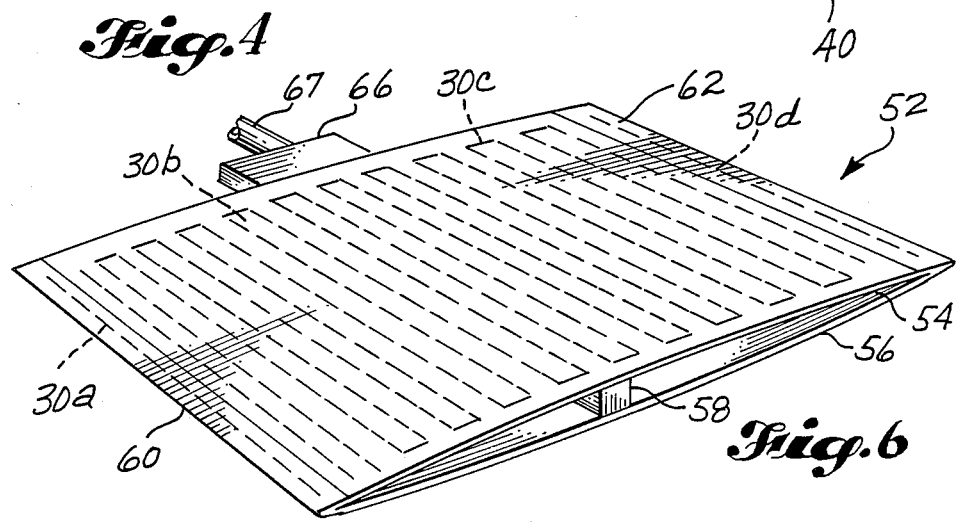
FIG. 6 is a pictorial view of a simulated wing section incorporating the structure shown in FIG. 5.

FIG. 4 illustrates the fabrication of a structure 54 in accordance with the invention In the illustrated example, the structure 54 is the compoundly curved top skin of a wing section, shown in FIG. 6. The skin 54 is fabricated by laying a plurality of layers 44, 46, 48 of composite material on a mold 40 in a known manner. Each layer 44, 46, 48 may comprise one or more plies of composite material. The inner adjacent layers 44 are formed by an electrically insulative composite material. The conductors 30a, 30b, 30c, 30d are positioned between the adjacent insulative layers 44. The top outer layer 46 and the bottom outer layer 48 may be either electrically insulative or conductive, as long as they are sufficiently insulated from the conductors by the inner insulative layers 44 to prevent shorting of the conductors 30a, 30b, 30c, 30d. After the composite material lay-up is complete, it is cured in a known manner to produce an integrated structure. During the lay-up and curing procedures, the matrices of the inner layers 44 bond together between the legs 34 of the conductors 30a, 30b, 30c, 30d to fully integrate the conductors into the structure.

Figure 5:
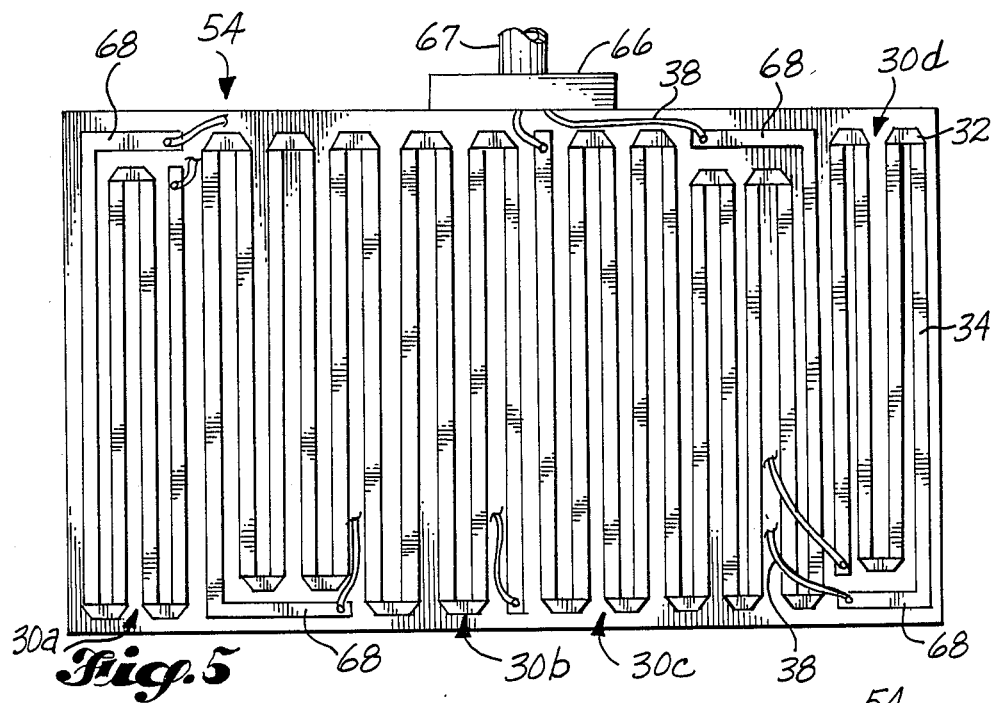
FIG. 5 is a bottom plan view of the completed lay-up shown in FIG. 4.

FIG. 5 is a bottom plan view of the rear face of the upper wing skin 54 shown being fabricated in FIG. 4. FIG. 6 is a pictorial view of the completed wing section simulating device 52. The device 52 includes the top skin 54, a bottom skin 56, and a center support 58 which maintains the skins 54, 56 in their proper spaced relationship. The two skins 54, 56 are joined along a leading edge 60 and a trailing edge 62. The wing section 52 may comprise a completed simulating device if it is desired to study the infrared signature of wing sections separately. Alternatively, the wing section 52 may be joined with other components to simulate the three dimensional shape of a complete aircraft or a more complete portion of an aircraft.

Referring to FIG. 5, in the structure that forms the upper skin 54, there are four separate conductors 30a, 30b, 30c, 30d interposed between the insulative layers 44. Each of the conductors 30a, 30b, 30c, 30d is formed by a resistance heating ribbon arranged in the type of continuous serpentine pattern illustrated in FIG. 3. Each conductor 30a, 30b, 30c, 30d is separately connectable to an electric power source by means of leads 38. Conductors 30a, 30d correspond to the leading edge and trailing edge portions of the skin 54, respectively. They are heated to different temperatures than the portions of the skin between the leading and trailing edges 60, 62 to simulate the actual heating profile of an aircraft wing in flight. The middle two conductors 30b, 30c may correspond to two different or a single temperature gradient on the outer surface of the skin 54. In the case of a single gradient, two conductors 30b, 30c might be provided instead of a single conductor for various reasons, such as maintaining power requirements within the capabilities of the installation in which the device 52 is to be tested, and maintaining voltage and current levels within safe limits to avoid risk of injury to personnel.

As can be seen in FIG. 5, the electric leads 38 extend from the end portions of the conductors 30a, 30b, 30c, 30d along the back surface of the skin section 54 to a conduit 67. One end of each conductor 30a, 30b, 30c, 30d forms an L-shaped side branch 68 to bring it closer to the middle portion of the wing section 52 away from the leading and trailing edges 60, 62. This arrangement of side branches 68 eliminates, or at least minimizes, any protrusion of the leads 38 from between the wing skins 54, 56 due to the lack of space between the skins 54, 56 at and near the edges 60, 62. A foam block 66 is positioned around the conduit 67 at the interface between the wing section 52 and the conduit 67 to reduce heat loss in the area of the conduit 67. The bottom skin 56 may also be provided with conductors in an appropriate pattern depending on the requirements of the tests to be conducted. Leads from conductors in the bottom skin 56 would also extend between the skins 54, 56 to the conduit 67. In the practice of the invention, the leads extend through the conduit 67 into a support for the wing section model 52, such as the support 14 shown in FIG. 2.

Figure 7:
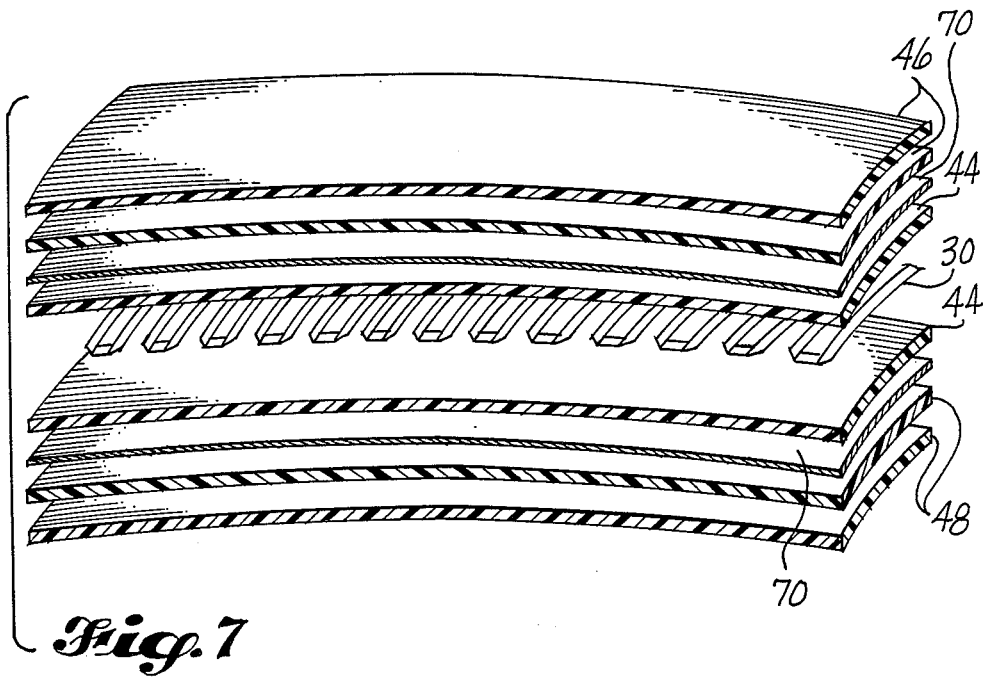
FIG. 7 is an exploded pictorial view of the type of lay-up shown in FIG. 4, illustrating the incorporation of heat conductive layers.

FIG. 7 is an exploded pictorial view of a modified form of the wing skin 54 shown in FIGS. 4-6. The structure shown in FIG. 7 includes top layers 46, two bottom layers 48, two intermediate insulative layers 44, and a conductor 30 positioned between the insulative layers 44. The structure also includes an additional feature of the invention in the form of sheets of metal foil 70. The upper sheet 70 is positioned between the upper insulative layer 44 and the top layers 46. The sheet 70 is thermally conductive to assist in minimizing temperature ridges and valleys on the outer surface of the topmost layer 46, i.e., to enhance the uniformity of the temperature gradient on the outer surface. When the composite material layers 44, 46 have resin matrices, the adherence of the matrices to the foil 70 is usually sufficient to maintain the integrity of the structure for modeling purposes. If desired, perforations may be formed in the foil 70 to permit bonding of the matrices through the foil to reinforce the adherence to the foil 70. Alternatively, a foraminous material, such as copper mesh, may be provided instead of the foil 70. The bottom sheet 70 of foil is provided between the lower insulative layer 44 and the bottom layers 48 in order to balance the lay-up. Balancing of the lay-up is not always essential but is generally desirable in order to avoid warping of the completed structure due to differences in the coefficients of expansion of the materials comprising the structure. The need to balance the structure is also the reason for the preferred positioning of the conductor 30 at the center of the structure, moving in a depthwise direction.

FIGS. 8 and 9 illustrate another example of a device 72 constructed according to the invention. The device 72 is shaped to simulate a "flying wing" type of aircraft. The top surface of the model 72 shown in FIG. 8 includes three temperature zones. The zone boundaries are indicated in FIG. 8 for the purposes of illustration, but would not ordinarily be visible in an actual model constructed according to the invention. Zone A includes the nose portion of the device 72 into which three conductors 30e, 30f, 30g are incorporated. Zone C represents the trailing edge portion of the aircraft 72 and has incorporated therein a single conductor 30i. Zone B is positioned between Zone A and Zone C and also has a single conductor 30h. The conductors 30e-i may be positioned between the same or different layers of composite material and may have the same or different electrical and physical characteristics. The conductors 30e-i are shown as two dimensional lines in FIG. 8 for the purpose of simplifying their illustration. FIG. 9 is an enlarged fragmentary view of a portion of Zone B and adjacent portions of Zone A and Zone C. FIG. 9 shows the folded ribbon pattern of the conductors 30e-i. Zone A is provided with three conductors 30e-g, rather than a single conductor, in order to avoid the large areas of ribbon overlap which would be required, because of space limitations, if the ribbon were folded at the points where the conductor 30f is adjacent to conductors 30e and 30g. The provision of three conductors 30e-g also makes it possible to vary the temperature gradient within Zone A if the actual temperature profile of the aircraft being simulated so requires.

Figure 10:
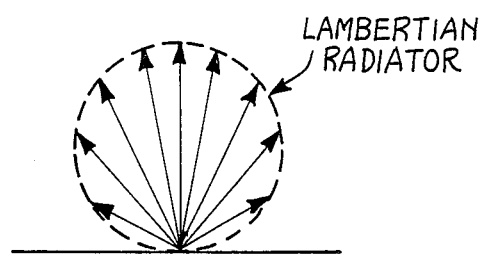
FIG. 10 is a diagram illustrating the pattern of infrared emission from a point on a Lambertian surface.

As noted above, FIG. 10 illustrates the pattern of infrared radiation from a point on a Lambertian surface. The vectors shown in FIG. 10 represent the direction and magnitude of emitted infrared energy. The dotted line encompassing the vectors represents the energy distribution. As described above, the distribution of energy emitted from a Lambertian surface is such that an infinite flat area will have the same effective radiance regardless of the viewing direction since the reduced vector length at glancing angles is offset by the increased surface area subtended by the detector's field of view.

Figure 11:
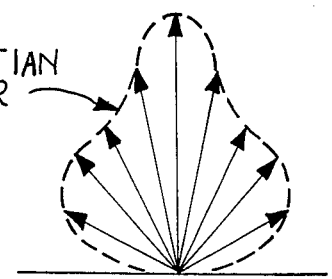
FIG. 11 is like FIG. 10 except that it illustrates emissions from a non-Lambertian surface.

The energy distribution illustrated in FIG. 10 is a representation of an idealized Lambertian surface. Although some surfaces have emissive patterns substantially like that represented in FIG. 10, many surfaces have emissive patterns that differ significantly from the Lambertian pattern. Non-Lambertian patterns vary widely with the exact form of the pattern being a function of the emitting surface's morphology and chemistry. FIG. 11 shows an example of a non-Lambertian energy distribution pattern. When a surface with a distribution pattern such as that shown in FIG. 11 is viewed, the amount of emitted energy perceived is highly dependent on the direction of the viewing angle. Thus, three dimensional characteristics of the surface, such as a slope away from the observer (detector), have a significant effect on the infrared signature perceived by the observer.

The need to take into account such three dimensional features in order to accurately represent the appearance of a surface to a detector is a primary reason for the inclusion in the invention of the important feature of forming the structures of the simulating device to simulate the actual three dimensional shapes of the objects or components being simulated. In theory, deviations in an emissive pattern from the Lambertian ideal could also be taken into account using a two dimensional model by measuring the directional properties of the surface and mathematically compensating for them. However, this procedure has limited accuracy and would greatly complicate and increase the cost of the determination of the infrared signature of the object.

In addition to providing an accurate simulation of the energy distribution of a single non-Lambertian surface, the three dimensional aspect of the invention also enables a device constructed according to the invention to accurately simulate the effect of variations in emissive patterns along different surfaces and different areas of the same surfaces. In the device of the invention, each surface or surface portion may be given the actual emissive characteristics of the corresponding part of the object being simulated by incorporating appropriate materials, such as coatings, into each area. When each surface area is given the actual emissive characteristics of the corresponding portion of the object, the combined effect of the surface properties is accurately simulated without any need for complex calculations, which would at best only approximate the true combined effect.

The device of the invention also accurately simulates the effect of reflections from one surface to another, the effect of varying surface orientations, and the effect of surface anomalies, such as openings or cavities in the surfaces and, to a lesser extent, surface roughness. An example of a situation in which radiation from a surface not viewed directly will be reflected from and thereby affect the infrared signature of another surface is illustrated in FIGS. 1 and 2. The aircraft model 20 shown therein has dual vertical tail fins 22. From a number of viewing angles, the inner surface of one of the fins 22 cannot be seen directly but produces radiation which affects the signature of the surface of the other fin 22 which is directly observed.

One of the great achievements of the invention is the ability to accurately simulate the combined effects of all of the factors discussed above by use of a single model without any need for corrective mathematical manipulations or other compensating procedures. The combined effects can be viewed from an unlimited number of angles, using the single model, to accurately predict the appearance of the object to a detector in virtually any field situation.

The high level of continuity in the temperature gradients achieved by the invention is made possible by the basic relationship between the conductor and the composite material in a structure constructed according to the invention. The spacing of the conductor legs and the dimensioning of the conductor depth are discussed above. The continuous winding pattern of the conductor maintains a uniform electric current through the conductor to produce predictable heating of the surrounding composite material. Since the composite material in the area of the conductor is insulative, there is no flow of current between adjacent spaced regions of the conductor, except the flow provided by the path of the conductor itself. Therefore, the invention avoids the problem of uneven current flow and consequential uneven heating which can be experienced in flow patterns in which current flows between positive and negative electrodes over large areas of resistive material to heat the resistive material. The uneven flow and heating in such arrangements is experienced when the positive and negative electrodes are not parallel and the current seeks the path of least resistance, i.e., the path where the electrodes are closest. Even when uneven heating is desired, it is extremely difficult to control the current flow and heating in such arrangements. On the other hand, in the system of the invention the evenness of the current flow is maintained and desired temperature variations are relatively easily achieved by varying the parameters of the invention, as discussed above.

In the practice of the preferred embodiment of the method of the invention, a simulating device, such as the model 20 shown in FIGS. 1 and 2, is mounted between screens 8, 12, as shown in FIG. 1. Electric current is supplied through the leads 38 to the conductors in the model 20 to heat the conductors and produce substantially continuous temperature gradients on the outer surfaces of the model 20. The outer surfaces are viewed with the infrared detector 2 from at least one angle to determine the infrared signature of the model 20 at that angle. Preferably, the outer surfaces are viewed from a plurality of angles to determine the infrared signature at each of the angles.

Each outer surface of the model 20 preferably either inherently has surface properties that produce, or is provided with a coating to produce, the infrared radiation pattern of the corresponding actual surface of the object represented by the model 20. If the surface properties of areas of the outer surfaces of the object have not finally been determined, or if for some other reason the effect of a particular type of coating needs to be studied, the method may include coating outer surface portions of the model 20 with a material under consideration, and viewing the model 20 with the detector 2 to determine the effect of the coating on the infrared signature of the model 20. When more than one type of coating is being studied, the method may further comprise removing the initial coating, and then applying a second coating to the outer surface portions and viewing the model 20 with the second coating thereon to determine the effect of the second coating on the infrared signature. Because of the relationship between the conductor and composite material in a model constructed according to the invention, various types of coatings may be applied and removed as desired without affecting the electrical conducting and heat generating characteristics of the model 20. The method may also be varied to study the effect of changes in the configuration of the object on the infrared signature. For example, in the model 20 shown in FIGS. 1 and 2, the wings of the aircraft or the tail fins 22 or some other component might be removed from the model 20 after an initial determination of the infrared signature and replaced with a similar component having a different configuration. The modified model could then be observed from the same angles from which the unmodified model 20 was observed to determine the effect of the change in configuration on the infrared signature. By this procedure, various types of changes in configuration of a single component, as well as the cumulative effect of changes in configuration of a plurality of components, may easily be studied.

While the model 20 is being viewed by the detector 2, it is desirable to monitor the heating of the composite material by the conductors to verify that the heating accurately simulates the patterns of heat generation produced by the actual object. This can be done by monitoring the output of thermocouples 36 positioned in the manner illustrated in FIG. 3. The thermocouples 36 are provided in sufficient numbers and at key points to give an accurate picture of the heating of the composite material. Each thermocouple 36 is spaced from the conductor 30 a distance sufficient to ensure that current flowing through the conductor 30 will not interfere with the output of the thermocouple 36. The monitoring of the heating can also be achieved by use of a thermal imaging system which displays on a screen a chroma tic representation of the thermal profiles.

In most cases, the infrared signature will be determined at a large number of different angles. The preferred means for accomplishing this is to tilt the model 20 to a plurality of angles corresponding to the plurality of desired viewing angles and to obtain a reading of the infrared signature through the detector 2 at each of the angles. Since the model 20 is being tilted, the detector 2 may remain stationary The tilting of the model 20 may be accomplished by various types of known servomechanisms mounted in the support 14. The arrangement of a tilting model 20 and a stationary detector 2 is very efficient and accurately simulates actual field situations such as the viewing of an aircraft by a detector located in a ground station.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A device for simulating the infrared signature of an object, said device comprising:
   a plurality of layers of fiber reinforced composite material, said layers including two adjacent electrically insulative layers; and
   an elongated conductor interposed between said two layers and connectable to an electric power source, said conductor being arranged in a continuous winding pattern having a plurality of spaced regions;
   wherein all of said layers are bonded together to form, with the conductor, an integral structure; said structure is shaped to simulate the three dimensional shape of the object; and said regions are sufficiently close to each other, and said conductor is positioned at a sufficient depth relative to an outer surface of said structure, to produce a substantially continuous temperature gradient on said outer surface when the conductor is heated by supplying electric power thereto.

2. The device of claim 1, in which the conductor comprises a resistance heating ribbon arranged in a serpentine pattern with a plurality of spaced substantially straight legs formed by folding said ribbon.

3. The device of claim 1, in which said conductor forms a first conductor; and which further comprises a second elongated conductor interposed between said two layers and spaced from said first conductor, said second conductor being arranged in a continuous winding pattern having a plurality of spaced regions, and said second conductor being connectable to an electric power source separately from said first conductor to produce a substantially uniform temperature gradient on said outer surface different from said gradient produced by said first conductor.

4. The device of claim 3, in which each said conductor comprises a resistance heating ribbon arranged in a serpentine pattern with a plurality of spaced substantially straight legs formed by folding said ribbon.

5. The device of claim 1, in which different adjacent pairs of said regions have different spacing between the regions in the pair to produce gradual temperature variations on said outer surface.

6. The device of claim 2, in which different adjacent pairs of said legs have different spacing between the legs in the pair to produce gradual temperature variations on said outer surface.

7. The device of claim 1, which further comprises a thermally conductive layer positioned between said conductor and said outer surface to assist in minimizing temperature ridges and valleys on said outer surface.

8. The device of claim 1, which further comprises a plurality of thermocouples positioned in said composite material between said regions of the conductor for monitoring heating of said plurality of layers by the conductor.

9. A device for simulating the infrared signature of an object, said device comprising:
   a plurality of structures, each said structure comprising:
   a plurality of layers of fiber reinforced composite material, said layers including two adjacent electrically insulative layers; and
   an elongated conductor interposed between said two layers and connectable to an electric power source, said conductor being arranged in a continuous winding pattern having a plurality of spaced regions;
   wherein all of said layers in each said structure are bonded together to form, with the conductor, an integral structure; each said structure is shaped to simulate the three dimensional shape of a portion of the object; in each said structure, said regions are sufficiently close to each other, and said conductor is positioned at a sufficient depth relative to an outer surface of said structure, to produce a substantially continuous temperature gradient on said outer surface when the conductor is heated by supplying electric power thereto; and said structures are joined together to simulate the three dimensional shape of the object.

10. The device of claim 9, in which, in each said structure, the conductor comprises a resistance heating ribbon arranged in a serpentine pattern with a plurality of spaced substantially straight legs formed by folding said ribbon.

11. The device of claim 9, in which, in at least one of said structures, said conductor forms a first conductor; and said one structure further comprises a second elongated conductor interposed between said two layers and spaced from said first conductor, said second conductor being arranged in a continuous winding pattern having a plurality of spaced regions, and said second conductor being connectable to an electric power source separately from said first conductor to produce a substantially uniform temperature gradient on said outer surface different from said gradient produced by said first conductor.

12. The device of claim 11, in which each said conductor comprises a resistance heating ribbon arranged in a serpentine pattern with a plurality of spaced substantially straight legs formed by folding said ribbon.

13. The device of claim 9, in which, in at least one of said structures, different adjacent pairs of said regions have different spacing between the regions in the pair to produce gradual temperature variations on said outer surface.

14. The device of claim 10, in which, in at least one of said structures, different adjacent pairs of said legs have different spacing between the legs in the pair to produce gradual temperature variations on said outer surface.

15. The device of claim 9, which further comprises, in at least one of said structures, a thermally conductive layer positioned between said conductor and said outer surface to assist in minimizing temperature ridges and valleys on said outer surface.

16. The device of claim 9, which further comprises a plurality of thermocouples positioned between said regions of the conductors for monitoring heating of said composite material by said conductors.

17. A method of determining the infrared signature of an object, said method comprising:
providing a device for simulating the infrared signature of an object, said device comprising a plurality of layers of fiber reinforced composite material, said layers including two adjacent electrically insulative layers; and an elongated conductor interposed between said two layers and connectable to an electric power source, said conductor being arranged in a continuous winding pattern having a plurality of spaced regions;
wherein all of said layers are bonded together to form, with the conductor, an integral structure; said structure is shaped to simulate the three dimensional shape of the object; and said regions are sufficiently close to each other, and said conductor is positioned at a sufficient depth relative to an outer surface of said structure, to produce a substantially continuous temperature gradient on said outer surface when the conductor is heated by supplying electric power thereto;
supplying electric current to the conductor to heat the conductor and produce a substantially continuous temperature gradient on said outer surface; and
viewing said outer surface with an infrared detector from at least one angle to determine the infrared signature at said angle.

18. The method of claim 17, comprising viewing said outer surface with an infrared detector from a plurality of angles to determine the infrared signature at each of said angles.

19. The method of claim 17, further comprising applying a coating to said outer surface; and viewing the coated outer surface with an infrared detector from said angle to determine the effect of the coating on the infrared signature.

20. The method of claim 18, further comprising applying a coating to said outer surface; and viewing the coated outer surface with an infrared detector from each of said angles to determine the effect of the coating on the infrared signature.

21. The method of claim 19, further comprising removing said coating from said outer surface; then applying a second coating to said outer surface; and then viewing said outer surface with an infrared detector from said angle to determine the effect of said second coating on the infrared signature.

22. The method of claim 20, further comprising removing said coating from said outer surface; then applying a second coating to said outer surface; and then viewing said outer surface with an infrared detector from each of said angles to determine the effect of said second coating on the infrared signature.

23. The method of claim 17, in which the step of providing said device comprises providing two separate conductors interposed between said two layers and arranged in continuous winding patterns; and said method comprises supplying electric current to each of said conductors to produce two different temperature gradients on said outer surface.

24. The method of claim 17, in which the step of providing said device comprises differentially spacing different adjacent pairs of said regions of the conductor to produce gradual temperature variations on said outer surface when electric current is supplied to the conductor.

25. The method of claim 17, in which the step of providing said device comprises positioning a thermally conductive layer between the conductor and said outer surface; and said method comprises allowing heat to be conducted along the thermally conductive layer to help minimize temperature ridges and valleys on said outer surface.

26. The method of claim 17, which comprises exposing opposite end portions of the conductor by removing composite material on a surface of said structure opposite said outer surface, and attaching insulated electrical conductors to the exposed end portions; and in which the step of supplying electric current comprises supplying electric current through the insulated conductors.

27. The method of claim 17, comprising positioning a plurality of thermocouples in said composite material between said regions of the conductor; and, while so viewing said outer surface, monitoring output from the thermocouples.

28. A method of determining the infrared signature of an object, said method comprising providing a device in accordance with claim 9; supplying electric current to each said conductor to heat the conductor and produce a substantially continuous temperature gradient on the corresponding outer surface; and viewing said outer surfaces of said structures with an infrared detector from a plurality of angles to determine the infrared signature at each of said angles.

29. The method of claim 28, in which the step of viewing said outer surfaces comprises tilting said device at said plurality of angles, and viewing said device with a stationary infrared detector.

30. The method of claim 28, further comprising applying a coating to at least one of said outer surfaces; and viewing the coated outer surface with an infrared detector from each of said angles to determine the effect of the coating on the infrared signature of the object.

31. The method of claim 30, further comprising removing said coating from said outer surface; then applying a second coating to said outer surface; and then viewing said outer surface with an infrared detector from each of said angles to determine the effect of said second coating on the infrared signature of the object.

32. The method of claim 28, in which the step of providing said device comprises providing, in at least one of said structures, two separate conductors interposed between said two layers and arranged in continuous winding patterns; and said method comprises supplying electric current to each of said conductors to produce two different temperature gradients on the corresponding outer surface.

33. The method of claim 28, in which the step of providing said device comprises, in at least one of said structures, differentially spacing different adjacent pairs of said regions of the conductor to produce gradual temperature variations on the corresponding outer surface when electric current is supplied to the conductor.

34. The method of claim 28, in which the step of providing said device comprises, in at least one of said structures, positioning a thermally conductive layer between the conductor and said outer surface; and said method comprises allowing heat to be conducted along the thermally conductive layer to help minimize temperature ridges and valleys on said outer surface.

35. The method of claim 28, which comprises providing an opening in said device, exposing opposite end portions of the conductor in each said structure by removing composite material on a surface of said structure opposite said outer surface, attaching insulated electrical conductors to the exposed end portions of each conductor, and extending the insulated conductors out of said device through said opening; and in which the step of supplying electric current comprises supplying electric current through the insulated conductors.

36. The method of claim 35, in which the step of viewing said outer surfaces comprises tilting said device at said plurality of angles, and viewing said device with a stationary infrared detector.

37. The method of claim 28, comprising positioning a plurality of thermocouples in said composite material in at least one of said structures between said regions of the conductor; and, while so viewing said outer surface, monitoring output from the thermocouples.

* * * * *